United States Patent
Andreev et al.

(10) Patent No.: US 7,653,618 B2
(45) Date of Patent: Jan. 26, 2010

(54) METHOD AND SYSTEM FOR SEARCHING AND RETRIEVING REUSABLE ASSETS

(75) Inventors: Dmitry Andreev, Port Chester, NY (US); Thomas Michael Dauffenbach, Prior Lake, MN (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/670,577

(22) Filed: Feb. 2, 2007

(65) Prior Publication Data

US 2008/0189261 A1 Aug. 7, 2008

(51) Int. Cl.
*G06F 7/00* (2006.01)
*G06F 17/30* (2006.01)
(52) U.S. Cl. .................................... 707/3; 707/4; 707/5
(58) Field of Classification Search ..................... 707/1, 707/3
See application file for complete search history.

(56) References Cited

U.S. PATENT DOCUMENTS

| | | |
|---|---|---|
| 6,275,820 B1 | 8/2001 | Navin-Chandra et al. |
| 6,421,675 B1 | 7/2002 | Ryan et al. |
| 6,516,312 B1 | 2/2003 | Kraft et al. |
| 6,701,311 B2 | 3/2004 | Biebesheimer et al. |
| 6,920,448 B2 | 7/2005 | Kincaid et al. |
| 2001/0047355 A1 | 11/2001 | Anwar |
| 2005/0154716 A1 | 7/2005 | Watson et al. |
| 2005/0256848 A1 | 11/2005 | Alpert et al. |
| 2006/0161524 A1 | 7/2006 | Roy et al. |
| 2007/0078822 A1* | 4/2007 | Cucerzan et al. ............... 707/3 |

FOREIGN PATENT DOCUMENTS

JP            7249023            9/1995

OTHER PUBLICATIONS

Vivien Petras; Girt and the Use of Subject Metadata for Retrieval; C. Peters et al. (Eds.): Multilingual Information Access for Text, Speech and Images; CLEF 2004, LNCS 3491; pp. 298-309; (2005).
Michael Keen; Query reformulation in ranked output interaction; Information Retrieval New Systems and Current Research; Taylor Graham Publishing; pp. 150-161; (1994).
Brandeis Hill; A Lattice Framework for Reusing Top-k Query Results; IEEE Systems, Man and Cybernetics Society (SMC); IEEE Catalog No. 05EX1058; pp. 38-43; (2005).

* cited by examiner

*Primary Examiner*—Apu M Mofiz
*Assistant Examiner*—Jared M Bibbee
(74) *Attorney, Agent, or Firm*—Schmeiser, Olsen & Watts; William E. Schiesser (57) ABSTRACT

A method and system for searching and retrieving reusable assets is disclosed. An index file in a database stores reusable assets. A search request history in the database stores past search requests and corresponding past search results. A search program performs a search upon receiving a new search request within the index file and generates a new search result. The search program correlates past search requests to the new search request by comparing search terms in past search requests to search terms in the new search request. Search terms in past search requests are replaced with semantically similar terms based on taxonomy level and synonyms and results of highly correlated past search requests are added to the new search result. Reusability of each reusable asset in the new search result is appraised.

20 Claims, 4 Drawing Sheets

CURRENT SEARCH REQUEST
$R_t = 0.5$

<u>801</u>
WEB-BASED
E-MAIL
SOLUTION
NETWORK
DIAGRAM

SEARCH REQUEST HISTORY
THREE PAST REQUESTS STORED

<u>811</u>
*WEB-BASED (1-240)*
CRM
APPLICATION
*NETWORK (1-240)*
*DIAGRAM (1-240)*

<u>1-240</u> Direct correlation: 3 common terms
<u>1-250</u> R = 2*3/(5+5) = 0.6 > Rt <u>812</u>
CLIENT-SERVER (2-260)
*E-MAIL (2-240)*
INFRASTRUCTURE
*NETWORK (2-240)*
OVERVIEW <u>2-240</u> Direct correlation: 2 common terms
<u>2-250</u> R = 2*2/(5+5) = 0.4 < Rt
<u>2-260</u> Taxonomy correlation: 1 term replaced,
       wherein "client server" and "web-based"
       in a same taxonomy level
<u>2-270</u> R = 2*(2 + 1*.5) /10 = 0.5 = Rt <u>813</u>
BROWSER-BASED (3-280)
MAIL (3-280)
APPLICATION (3-280)
*NETWORK (3-240)*
BLUEPRINT(3-280)

<u>3-240</u> Direct correlation: 1 common term
<u>3-250</u> R = 2*1/(5+5) = 0.2 < Rt
<u>3-260</u> Taxonomy substitution: 0 term replaced
<u>3-270</u> R = 2*(1+0) /10 = 0.2 < Rt
<u>3-280</u> Synonym correlation: 4 terms replaced
       wherein
       "browser-based" is a synonym of "web-
       based"; "mail" is a synonym of "e-mail";
       "application" is a synonym of "solution"; and
       "blueprint" is a synonym of "diagram"
<u>3-290</u> R = 2*(1 + 4*.5) /10 = 0.6 > Rt

METHOD AND SYSTEM FOR SEARCHING AND RETRIEVING REUSABLE ASSETS

FIELD OF THE INVENTION

The present invention discloses a method and system for searching and retrieving reusable assets in a software development system.

BACKGROUND OF THE INVENTION

Conventional methods for searching and retrieving reusable software assets perform each search request separately. Consequently, conventional search and retrieval methods do not meaningfully appraise the reusability of a reusable asset in a software development system over time. A repetitive search request for a specific reusable asset may return a same irrelevant result every time because conventional search methods do not have information on search requests performed in the past. Also, even when two different search requests are for a same specific reusable asset, if the two search requests are versed in semantically similar but not identical search terms, two search results may be completely unrelated to each other. Thus, there is a need for a method and system that overcomes at least one of the preceding disadvantages of current methods for searching and retrieving reusable assets.

SUMMARY OF THE INVENTION

The present invention provides a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request; said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request;

adjusting a relevance of each reusable asset within the new search result, and storing the new request and the new search result into the search request history in the database, wherein said receiving, said searching, said building, said retrieving, said correlating, said adjusting, and said storing are performed by a search server, and wherein the search server is configured to store into and retrieve from the database.

The present invention provides a computer program product, comprising a computer usable medium having a computer readable program code embodied therein, said computer readable program code containing instructions that when executed by a processor of a computer system implement a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request; said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request;

adjusting a relevance of each reusable asset within the new search result, and storing the new request and the new search result into the search request history in the database, wherein said receiving, said searching, said building, said retrieving, said correlating, said adjusting, and said storing are performed by a search server, and wherein the search server is configured to store into and retrieve from the database.

The present invention provides a computer system comprising a processor and a computer readable memory unit coupled to the processor, said memory unit containing instructions that when executed by the processor implement a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request; said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request;

adjusting a relevance of each reusable asset within the new search result, and storing the new request and the new search result into the search request history in the database, wherein said receiving, said searching, said building, said retrieving, said correlating, said adjusting, and said storing are performed by a search server, and wherein the search server is configured to store into and retrieve from the database.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request; said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request;

adjusting a relevance of each reusable asset within the new search result, and storing the new request and the new search result into the search request history in the database, wherein said receiving, said searching, said building, said retrieving, said correlating, said adjusting, and said storing are performed by a search server, and wherein the search server is configured to store into and retrieve from the database.

The present invention provides a method and system that overcomes at least one of the current disadvantages of conventional method and system for searching and retrieving reusable assets.

DETAILED DESCRIPTION OF THE INVENTION

Modern software development systems are often object-oriented, and a solution of a specific problem is reused whenever the solution is necessary within a software development cycle. Therefore, solutions within a software development system are linked to specific problems, stored in a database, and searched when a new problem occurs during a software development cycle. Each solution is called a reusable asset in a software development system.

The present invention introduces an improved searching and retrieving method for reusable assets. The method of present invention correlates a new request for a reusable asset with a past request. If the correlation between the new request and the past request is higher than a predefined degree, the method of present invention updates a search result of the new request to include a search result of the past request, and adjusts a relevance of the search result of the past request to indicate that the search result of the past request are also highly correlated to the search result of the new request.

The method of present invention determines the correlation between the new request and the past request according to the semantic similarity of search terms in two aforementioned search requests. Where search terms in the past request is not highly correlated to search terms in the new request, the method of present invention may replace some search terms in the new request with other search terms in a same taxonomy level and synonyms.

The method of present invention employs traditional search methods in performing searches. Examples of traditional search methods may be, inter alia, Boolean search, form-based search, etc.

The method of present invention overcomes disadvantages of conventional search methods by storing past search requests and search results, by correlating past search requests and results to a new search request and result, by performing multiple searches with replaced search terms, and by reorganizing search requests and search results.

Figure 1:
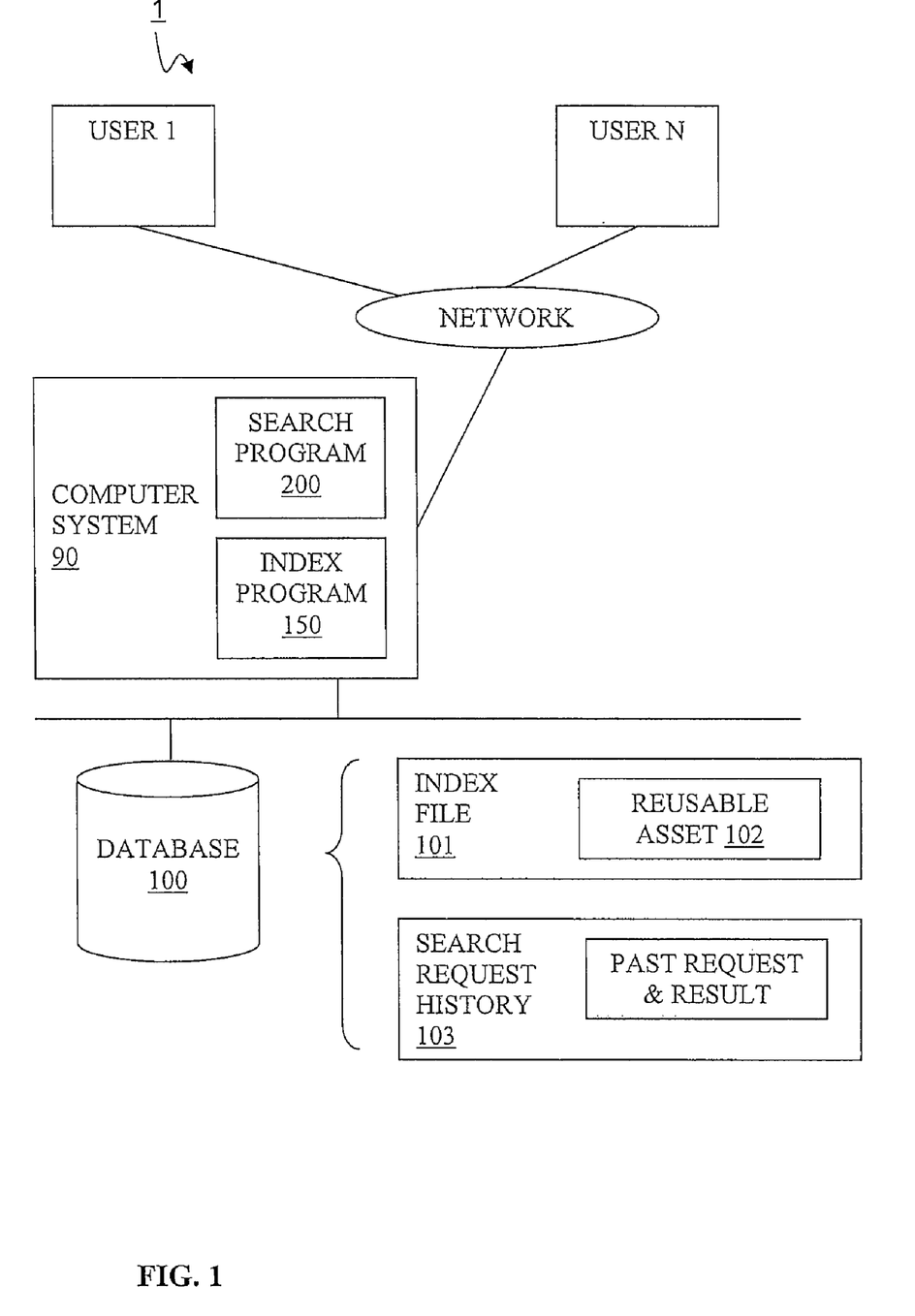
FIG. 1 depicts a system for searching and retrieving reusable assets, comprising user computers, a computer system, and a database, the computer system comprising a search program and an index program, the computer system being coupled to user computers via a network, and the database being coupled to the computer system via Local Area Network (LAN), in accordance with embodiments of the present invention.

FIG. 1 depicts a system 1 for searching and retrieving reusable assets, comprising user computers, a computer system 90, and a database 100, the computer system comprising a search program 200 and an index program 150, the computer system being coupled to user computers via a network, and the database being coupled to the computer system via Local Area Network (LAN), in accordance with embodiments of the present invention.

An index program 150 and a search program 200 are running on the computer system 90. The computer system 90 hosts a search program 200 and an index program 150. The index program indexes reusable assets 102 into an index file 101 and stores index files into the database 100.

The search program services a search request of a user by looking up search terms comprising the search request in the index files, correlating present search request and past search requests, and adjusting relevance of past search result as to the present search result. Relevance may be adjusted pursuant to, inter alia, the number of occurrences of the search term within the reusable asset being searched, etc.

A reusable asset 102 stored in an index file 101 is a cohesive collection of files that solve a software development problem. A reusable asset is an asset which has been developed to be reused. A reusable asset 102 comprises a manifest and an artifact. A manifest is a metadata information document that describes the structure and elements of a reusable asset. An artifact is a container of multiple files, or a file representing a workspace product. The search program is configured to perform a Boolean and/or a form-based search on the reusable assets stored in the database server, for search terms occurring in both the fields of a manifest file and the text of artifacts.

A search request history 103 is stored in the database. The search request history comprises all past requests and a past search result associated with each past request. The past search result is a reusable asset retrieved by the end user as a result of servicing the corresponding past request. The search request history may have a pointer to a reusable asset stored in the index file instead of actual data of the reusable asset.

Figure 2:
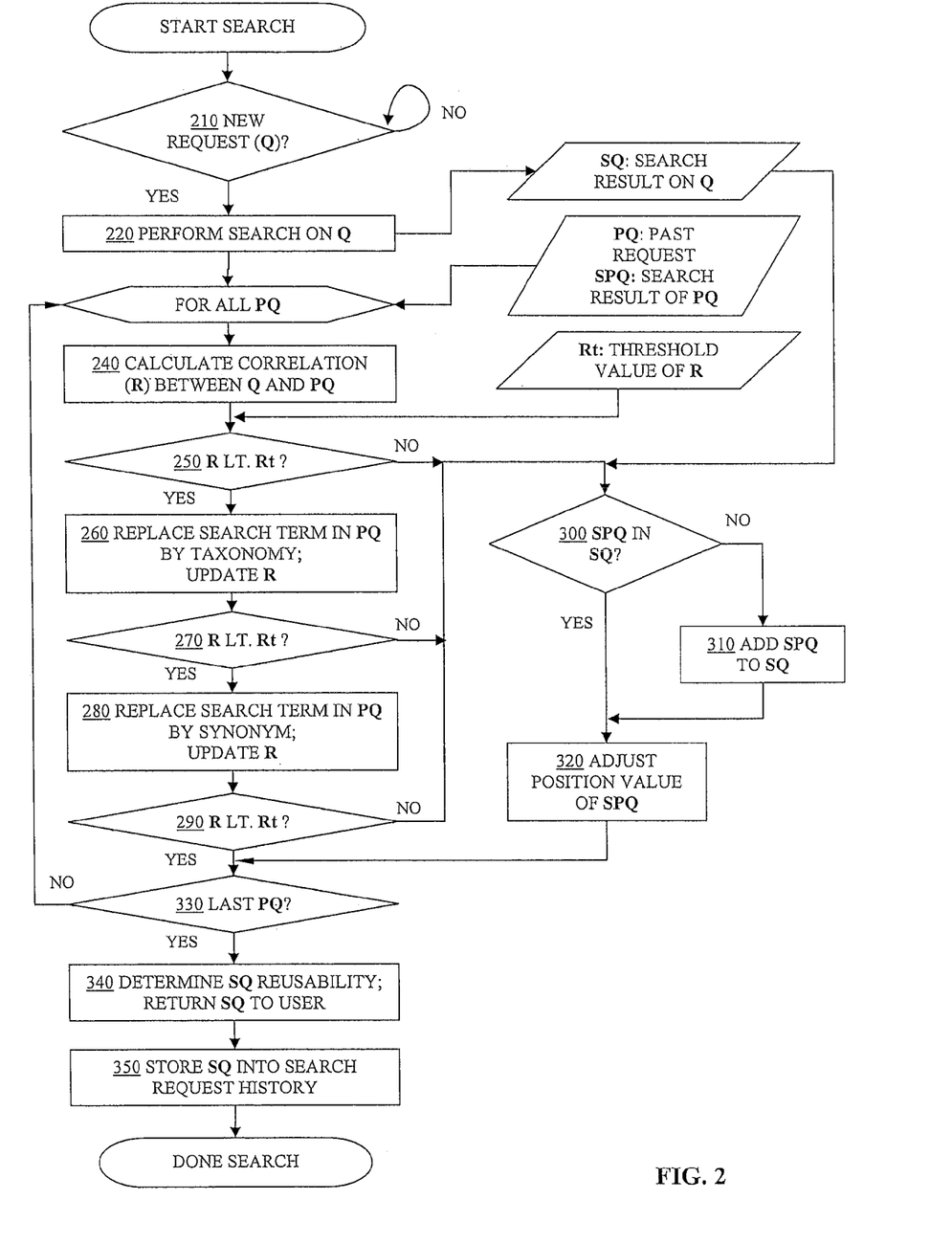
FIG. 2 is a flowchart depicting a method for searching and retrieving reusable assets performed by the search program of FIG. 1, supra, in accordance with embodiments of the present invention.

FIG. 2 is a flowchart depicting a method for searching and retrieving reusable assets performed by the search program of FIG. 1, supra, in accordance with embodiments of the present invention.

In step 210, the search program waits for a user to input a request for search. If the search program determines that a new request (Q) has been received, then the search program proceeds to step 220. If there is no new request received from a user, the search program waits for a new request in step 210.

In step 220, the search program performs a search for the new request received in step 210. The search program examines all search terms comprising the new request in index files stored in the database, and then builds a new search result (SQ) which comprises a search term and a reusable asset mapped to the search term within an index file. Any traditional search method may be used in searching index files, including but not limited to, Boolean searching, form-based searching, etc.

Before step 240 is performed, all past requests (PQs) and a past search result (SPQ) corresponding to each past request is stored in the database as a search request history. Initially, there is at least one past request stored in the search request history, along with a past search result for the past request. If there is no past request in the search request history, the search program stores the new request (Q) and the new search result (SQ) to the search request history and terminates execution. The search program iterates steps 240 to 330 for each past request in the search request history.

In step 240, the search program calculates a correlation coefficient R which represents the degree of correlation between the past request (PQ) and the new request (Q) pursuant to the Formula 1, infra, of the present invention.

When the new request is received, the search program would correlate the new request with all past requests in the search request history in order to maximize the value of the correlation coefficient R.

The correlation coefficient R is:

$$R = \frac{2n_c}{n_n + n_p},\qquad\text{(Formula 1)}$$

wherein R is the value of the correlation coefficient between the new request and a past request, $n_c$ is a number of search terms common to both the new request and the past request, $n_n$ is a number of search terms in the new request, and $n_p$ is a number of search terms in the past request.

In step 250, the search program compares the value of correlation coefficient R with a predefined correlation threshold value Rt within a range of 0.2 to 0.99. If the search program determines that the value of correlation coefficient R is greater than or equal to the value of Rt, then the search program proceeds to step 300 to update the new search result. If the search program determines that the value of correlation coefficient R is less than the value of Rt, then the search program proceeds to step 260.

In step 260, the search program replaces each search term in the past request that is not common to the new search request with a search term in the new request, if the search term in the past request and the search term in the new request belong to same taxonomy level, and then updates the value of the correlation coefficient R representing the correlation between the past request comprising search terms replaced by taxonomically equivalent terms and the new request. Taxonomy data is stored in a memory device accessible from the search program, including but not limited to the database. The search program looks up the taxonomy data and determines a taxonomy level of each search term in the new request. If the search program determines to replace a specific search term in the past request, the search program replaces the search term with any one of other terms in the same taxonomy level as the search term of the new request.

The value of correlation coefficient R is:

$$R = \frac{2(n_c + mr)}{n_n + n_p}\qquad\text{(Formula 2)}$$

wherein R is the value of the correlation between the new request and the past request with replaced search terms, $n_c$ is the number of search terms common to both the new request and the past request, $n_c$ is the number of search terms in the new request, $n_p$ is the number of search terms in the past request, m is a number of search terms in the past request being replaced by a respective term from a same taxonomy level for each search term, and r is a predefined value within a range of 0 to 1.

In step 270, the search program compares the value of correlation coefficient R with a predefined correlation threshold value Rt within a range of 0.2 to 0.99. If the search program determines that the value of correlation coefficient R is greater than or equal to the value of Rt, then the search program proceeds to step 300 to update the new search result. If the search program determines that the value of correlation coefficient R is less than the value of Rt, then the search program proceeds to step 280.

In step 280, the search program replaces each search term in the past request that is not common to the new search request with a search term in the new request, if the search term in the past request is a synonym of the search term in the new request, and then updates the value of the correlation coefficient R representing the correlation between the past request with search terms replaced by synonyms and the new request. The search program selects a synonym to replace a search term of the past request from thesaurus data for the search term, which is stored in a memory device accessible from the search program, including but not limited to the database.

The value of correlation coefficient R is:

$$R = \frac{2(n_c + kr)}{n_n + n_p}\qquad\text{(Formula 2-1)}$$

wherein R is the value of the correlation between the new request and the past request with replaced search terms, $n_c$ is the number of search terms common to both the new request and the past request, $n_c$ is the number of search terms in the new request, $n_p$ is the number of search terms in the past request, k is a number of search terms in the past request being replaced by a respective synonym for each search term, and r is a predefined value within a range of 0 to 1.

In step 290, the search program compares the value of correlation coefficient R with a predefined correlation threshold value Rt within a range of 0.2 to 0.99. If the search program determines that the value of correlation coefficient R is greater than or equal to the value of Rt, then the search program proceeds to step 300 to update the new search result. If the search program determines that the value of correlation coefficient R is less than the value of Rt, then the search program proceeds to step 330.

The search program in step 300 determines whether a past search result (SPQ) is present in the new search result (SQ). If the search program determines that the past search result (SPQ) is not present in the new search result (SQ), the search program in step 310 adds the past search result (SPQ) to the new search result (SQ). After updating the new search result, the search program proceeds to step 320. If the search program determines that the past search result is already present in the new search result, the search program directly proceeds to step 320.

In step 320, the search program adjusts a position value of the past search result within the new search result. The position value indicates how relevant the past search result is to the new search result. The position value P of the past search result which has been found to be highly correlated to the new search result is:

$$P = \text{Round}(wRS) \quad \text{(Formula 3)},$$

wherein Round(x) is a mathematical function returning a closest integer to x, w is a predefined weight coefficient chosen from a range of 0.1 to 1, R is the value of the coefficient correlation representing the correlation between the new request and the past request, and S is a size of the new search result, denoting a number of reusable assets in the new search result.

In step 330, the search program determines whether all past requests within the search request history were processed upon the new request. If the search program determines that, within the search request history, there is a past requests that is not serviced yet, the search program sets a next past request in the search request history as a past request, and loops back to step 240. If all past requests within the search request history were processed against the new request, the search program proceeds to step 340.

In step 340, the search program determines reusability of a reusable asset within the new search result, and, in step 350, stores the new request and the new search result into the search request history. The search program determines a quality metric value for each reusable asset in the new search result. The quality metric value represents the degree of reusability of an asset. Examples of quality metrics for a reusable asset may be, inter alia, a certification, an error test result, and a feedback from users of the reusable asset, etc. An asset may be certified for a high reusability of the asset. A certified asset may have a larger quality metric value than a normal quality metric value without certification. An asset also may be tested for errors within the asset, and then a quality metric value for the asset may be reduced if the asset contains more errors than a predefined threshold. If an asset had been used in the past by users, a quality metric value of the asset may be multiplied by a user feedback value in a range 0.1 to 1.0 to reduce the quality metric value.

In step 350, an end user may select not to store the new request and the new search result into the search request history, depending on the quality metric value of the reusable asset in the new search result. Also, if the search program determines that the relevance of the new search result retrieved by the end user was lower than a predefined threshold value, then the end user may elect to update taxonomy data used in step 260 and/or thesaurus data used in step 280. The search program adds search terms comprising the search request to taxonomy data and/or thesaurus data, respectively. The end user may elect to add the terms used in metadata describing the reusable asset retrieved as a result of servicing the search request, because the terms in metadata are semantically similar to the search terms in the search request.

Figure 3:
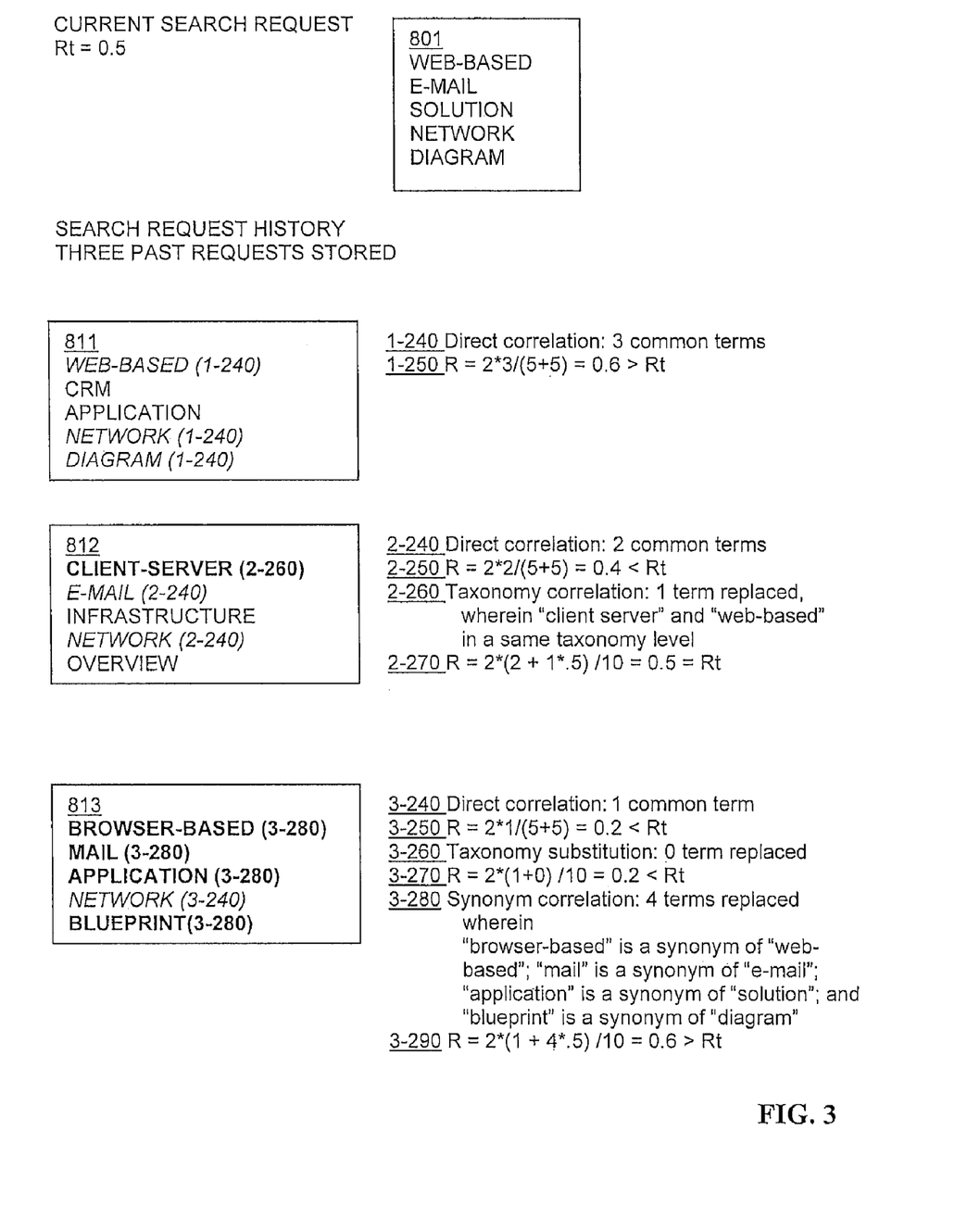
FIG. 3 depicts an example performing a search for a new request, in accordance with embodiments of the present invention.

FIG. 3 depicts an example performing a search for a new request, in accordance with embodiments of the present invention. The new request 801 "web-based e-mail solution network diagram" comprises five search terms. A new search result comprising assets associated with the search terms are not shown in FIG. 3. A threshold value (Rt) of correlation coefficient is 0.5.

In a search request history file, there are three past requests 811, 812, and 813. In the first iteration of steps 240 to 330, the search program selects a past request 811 "web-based CRM application network diagram." There are five search terms in the past request 811, and three of five search terms are common. Consequently, the correlation coefficient R value in step 250 is, according to Formula 1, 2*3/(5+5)=0.6, which is greater than the threshold value (Rt) of correlation coefficient 0.5. The search program proceeds to step 300 to determine whether the past search result of the past request 811 is present in the new search result of the new request 801. After ascertaining that the past search result is present in the new search result in steps 300 and 310, the search program in step 320 adjusts a position value P of the past search result within the new search result, and proceeds to step 330. In step 330, because there are other past requests left, the search program loops back to step 240.

In the second iteration of steps 240 to 330, the search program selects a next past request 812 "client-server e-mail infrastructure network overview." There are five search terms in the past request 812, and two of five search terms are common. Consequently, the correlation coefficient R value in step 250 is, according to Formula 1, 2*2/(5+5)=0.4, which is less than the threshold value of correlation coefficient 0.5. The search program proceeds to step 260 to replace the search terms in the past request 812 by taxonomy. Because the search term "client-server" is in the same taxonomy level with the search term "web-based" in the new request, the m value in Formula 2 is 1. The value of r is predefined as 0.5. Consequently, the correlation coefficient R value in step 270 is, according to Formula 2, 2*(2+1*0.5)/(5+5)=0.5, which is equal to the threshold value of correlation coefficient 0.5.

The search program proceeds to step 300 to determine whether the past search result of the past request 812 is present in the new search result of the new request 801. After ascertaining that the past search result of the past request 812 is present in the new search result of the new request 801 in steps 300 and 310, the search program in step 320 adjusts a position value P of the past search result of the past request 812 within the new search result, and proceeds to step 330. In step 330, because there is a past request left, the search program loops back to step 240.

In the third iteration of steps 240 to 330, the search program selects next past request 813 "browser-based mail application network blueprint." There are five search terms in the past request 813, and one of five search terms are common. Consequently, the correlation coefficient R value in step 250 is, according to Formula 1, 2*1/(5+5)=0.2, which is less than the threshold value of correlation coefficient 0.5. The search program proceeds to step 260 to replace the search terms in the past request 813 by taxonomy. The search program did not replace any search term by taxonomy because there is no taxonomy data for the search terms in the past request 813. Consequently, the correlation coefficient R value in step 270 is, according to Formula 2, 2*(1+0*0.5)/(5+5)=0.2, which is less than the threshold value of correlation coefficient 0.5. The search program proceeds to step 280 to replace the search terms in the past request 813 by synonyms. The term "browser-based" is a synonym of the term "web-based." The term "mail" is a synonym of the term "e-mail." The term "application" is a synonym of the term "solution." The term "blueprint" is a synonym of the term "diagram." The search program replaces foregoing four search terms with their respective synonyms, and proceeds to step 290. The correlation coefficient R value calculated in step 290 is, according to Formula 2-1, 2*(1+4*0.5)/(5+5)=0.6, which is greater than the threshold value of correlation coefficient 0.5.

The search program proceeds to step 300 to determine whether the past search result of the past request 813 is present in the new search result of the new request 801. After ascertaining that the past search result of the past request 813 is present in the new search result of the new request 801 in steps 300 and 310, the search program in step 320 adjusts a position value P of the past search result of the past request 812 within the new search result, and proceeds to step 330. In step 330, because all past requests are related to the new request and there is no other past request left, the search program proceeds to step 340.

In step 340, the search program determines reusability of all reusable assets within the new search result of the new request 801.

Figure 4:
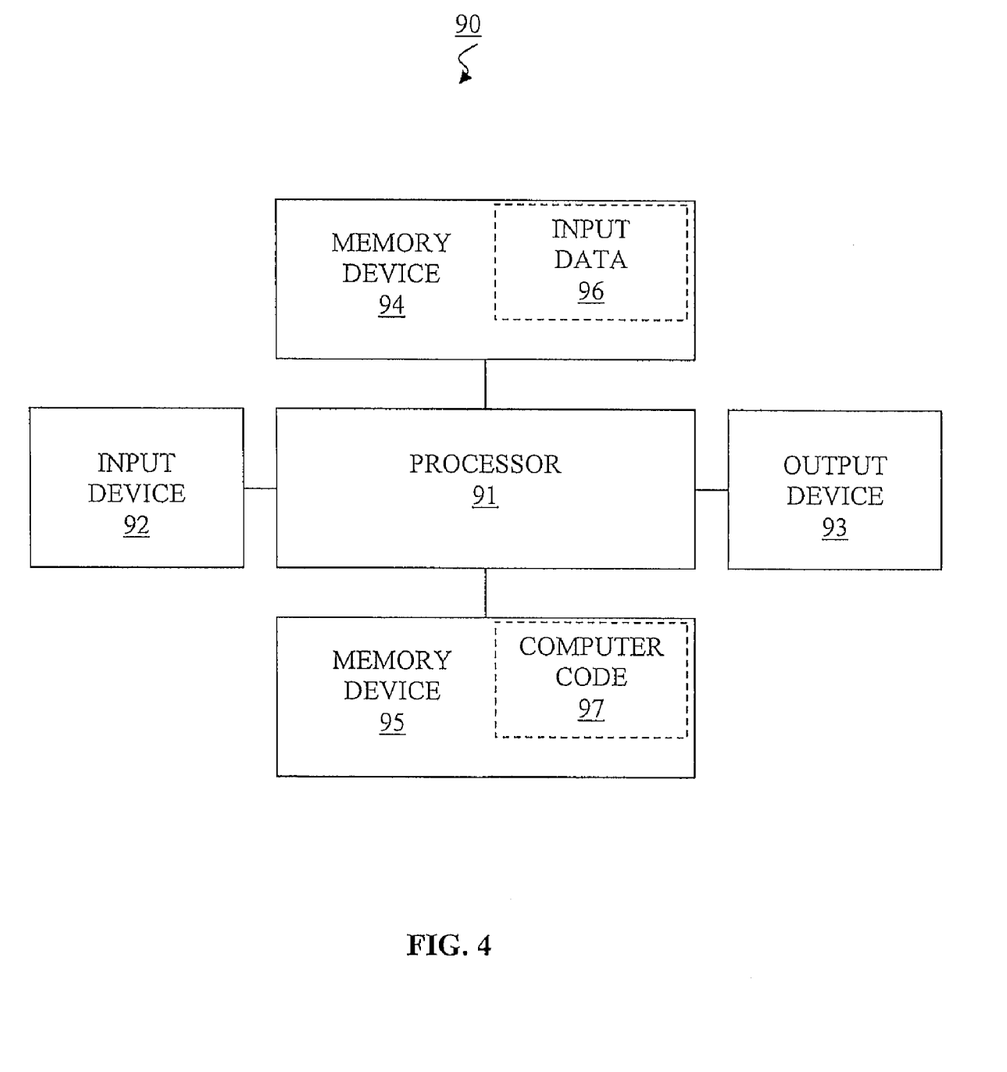
FIG. 4 illustrates a computer system used for searching and retrieving reusable assets, in accordance with embodiments of the present invention.

FIG. 4 illustrates a computer system 90 used for searching and retrieving reusable assets, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for searching and retrieving reusable assets according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a reusable asset search and retrieval process of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for searching and retrieving reusable assets in a software development system.

In another embodiment, the invention provides a business method that performs the process steps of the invention on a subscription, advertising and/or fee basis. That is, a service provider, such as a Solution Integrator, can offer to create, maintain, support, etc. a process for searching and retrieving reusable assets of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be mown to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request, said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

a processor of a computer system correlating the new request with the past request, said correlating comprising:

calculating a correlation coefficient R between the new request and the past request;

determining the correlation coefficient R being greater than or equal to a first predefined threshold value $R_t$ for request correlation in a range of 0.2 to 0.99;

adding the past search result to the new search result, wherein the past search result is not present within the new search result; and calculating a position value P of the past search result within the new search result as P=Round(wRS), wherein Round(x) is a mathematical function returning a closest integer to x, w is a predefined weight value chosen from a range of 0.1 to 1, and S is a number of reusable assets in the new search result;

adjusting a relevance of each reusable asset within the new search result, the relevance indicating how the past search result for said each reusable asset is correlated with the new search result pursuant to a number of occurrences of said at least one search term in said each reusable asset; and storing the new request and the new search result into the search request history in the database upon determining that the relevance of said each reusable asset in the new search result is greater than a second predefined threshold value for the relevance, wherein said receiving, said searching, said building, said retrieving, said correlating, said adjusting, and said storing are performed by a search sewer that operates in the computer system, and wherein the search server is configured to store into and retrieve from the database.

2. The method of claim 1, said calculating the correlation coefficient R comprising:
   calculating the correlation coefficient R, wherein $$R = \frac{2n_c}{n_n + n_p},$$

wherein $n_c$ is a number of search terms common to both the new request and the past request, $n_n$ is a number of search terms in the new request, and $n_p$ is a number of search terms in the past request.

3. The method of claim 1, said calculating the correlation coefficient R comprising:
   calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request; and
   calculating the correlation coefficient R, wherein $$R = \frac{2(n_c + mr)}{n_n + n_p},$$

wherein the first correlation coefficient $R_1$ is less than the predefined threshold value $R_t$, wherein m is a number of search terms being replaced by a respective term from a same taxonomy level for each search term, and r is a predefined rate value within a range of 0 to 1.

4. The method of claim 1, said calculating the correlation coefficient R comprising:
   calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request;
   calculating a second correlation coefficient $R_2$ between the new request and the past request, wherein $$R_2 = \frac{2(n_c + mr)}{n_n + n_p},$$

wherein the first correlation coefficient $R_1$ is less than the predefined threshold value $R_t$, wherein m is a number of search terms in the past request being replaced by a respective term from a same taxonomy level for each search term, and r is a predefined rate value within a range of 0 to 1; and
   calculating the correlation coefficient R, wherein $$R = \frac{2(n_c + kr)}{n_n + n_p},$$

wherein the second correlation coefficient $R_2$ is less than the predefined threshold value $R_t$, wherein k is a number of search terms in the past request being replaced by a respective synonym for each search term.

5. The method of claim 1, said adjusting comprising:
   mapping each reusable asset in the new search result to a predefined quality metric to determine reusability for each reusable asset within the new search result, wherein the predefined quality metric is selected from the group consisting of a certification, an error test result, a user feedback, and combinations thereof.

6. A computer program product, comprising a computer usable medium having a computer readable program code embodied therein, said computer readable program code containing instructions that when executed by a processor of a computer system implement a method for searching and retrieving at least one reusable asset, a first asset of said at least one reusable asset being stored in an index file in a database, a search request comprising at least one search term, the method comprising:
   receiving a new request comprising a first search term of said at least one search term;
   searching the index file for the first search term in the new request, said searching comprising selecting, from the index file, all reusable assets having the first search term;
   building a new search result with all reusable assets having been selected from the index file during said searching;
   retrieving a past request from a search history stored in the database, the past request comprising a second search term of said at least one search term, the past request being coupled to a past search result comprising a second asset of said at least one reusable asset;
   correlating the new request with the past request, said correlating comprising:
      calculating a correlation coefficient R between the new request and the past request;
      determining the correlation coefficient R being greater than or equal to a first predefined threshold value $R_t$ for request correlation in a range of 0.2 to 0.99;
      adding the past search result to the new search result, wherein the past search result is not present within the new search result; and
      calculating a position value P of the past search result within the new search result as P=Round(wRS), wherein Round(x) is a mathematical function returning a closest integer to x, w is a predefined weight value chosen from a range of 0.1 to 1, and S is a number of reusable assets in the new search result;
   adjusting a relevance of each reusable asset within the new search result, the relevance indicating how the past search result for said each reusable asset is correlated with the new search result pursuant to a number of occurrences of said at least one search term in said each reusable asset; and
   storing the new request and the new search result into the search request history in the database upon determining that the relevance of said each reusable asset in the new search result is greater than a second predefined threshold value for the relevance, wherein said receiving, said searching, said building, said retrieving, said correlating, said adjusting, and said storing are performed by a search server, and wherein the search server is configured to store into and retrieve from the database.

7. The computer program product of claim 6, said calculating the correlation coefficient R comprising:

calculating the correlation coefficient R, wherein $$R = \frac{2n_c}{n_n + n_p},$$

wherein $n_c$ is a number of search terms common to both the new request and the past request, $n_n$ is a number of search terms in the new request, and $n_p$ is a number of search terms in the past request.

8. The computer program product of claim 6, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request; and calculating the correlation coefficient R, wherein $$R = \frac{2(n_c + mr)}{n_n + n_p},$$

wherein the first correlation coefficient $R_1$ is less than the predefined threshold value $R_t$, wherein m is a number of search terms being replaced by a respective term from a same taxonomy level for each search term, and r is a predefined rate value within a range of 0 to 1.

9. The computer program product of claim 6, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request;

calculating a second correlation coefficient $R_2$ between the new request and the past request, wherein $$R_2 = \frac{2(n_c + mr)}{n_n + n_p},$$

wherein the first correlation coefficient $R_1$ is less than the predefined threshold value $R_t$, wherein m is a number of search terms in the past request being replaced by a respective term from a same taxonomy level for each search term, and r is a predefined rate value within a range of 0 to 1; and calculating the correlation coefficient R, wherein $$R = \frac{2(n_c + kr)}{n_n + n_p},$$

wherein the second correlation coefficient $R_2$ is less than the predefined threshold value $R_t$, wherein k is a number of search terms in the past request being replaced by a respective synonym for each search term.

10. The computer program product of claim 6, said adjusting comprising:

mapping each reusable asset in the new search result to a predefined quality metric to determine reusability for each reusable asset within the new search result, wherein the predefined quality metric is selected from the group consisting of a certification, an error test result, a user feedback, and combinations thereof.

11. A computer system comprising a processor and a computer readable memory unit coupled to the processor, said memory unit containing instructions that when executed by the processor implement a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request, said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request, said correlating comprising:

calculating a correlation coefficient R between the new request and the past request;

determining the correlation coefficient R being greater than or equal to a first predefined threshold value $R_t$ for request correlation in a range of 0.2 to 0.99;

adding the past search result to the new search result, wherein the past search result is not present within the new search result; and calculating a position value P of the past search result within the new search result as P=Round(wRS), wherein Round(x) is a mathematical function returning a closest integer to x, w is a predefined weight value chosen from a range of 0.1 to 1, and S is a number of reusable assets in the new search result;

adjusting a relevance of each reusable asset within the new search result, the relevance indicating how the past search result for said each reusable asset is correlated with the new search result pursuant to a number of occurrences of said at least one search term in said each reusable asset; and storing the new request and the new search result into the search request history in the database upon determining that the relevance of said each reusable asset in the new search result is greater than a second predefined threshold value for the relevance, wherein said receiving, said searching, said building, said retrieving, said correlating, said adjusting, and said storing are performed by a search server, and wherein the search server is configured to store into and retrieve from the database.

12. The computer system of claim 11, said calculating the correlation coefficient R comprising:

calculating the correlation coefficient R, wherein $$R = \frac{2n_c}{n_n + n_p},$$

wherein $n_c$ is a number of search terms common to both the new request and the past request, $n_n$ is a number of search terms in the new request, and $n_p$ is a number of search terms in the past request.

13. The computer system of claim 11, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request; and calculating the correlation coefficient R, wherein $$R = \frac{2(n_c + mr)}{n_n + n_p},$$

wherein the first correlation coefficient $R_1$ is less than the predefined threshold value $R_t$, wherein m is a number of search terms being replaced by a respective term from a same taxonomy level for each search term, and r is a predefined rate value within a range of 0 to 1.

14. The computer system of claim 11, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request;

calculating a second correlation coefficient $R_2$ between the new request and the past request, wherein $$R_2 = \frac{2(n_c + mr)}{n_n + n_p},$$

wherein the first correlation coefficient $R_1$ is less than the predefined threshold value $R_t$, wherein m is a number of search terms in the past request being replaced by a respective term from a same taxonomy level for each search term, and r is a predefined rate value within a range of 0 to 1; and calculating the correlation coefficient R, wherein $$R = \frac{2(n_c + kr)}{n_n + n_p},$$

wherein the second correlation coefficient $R_2$ is less than the predefined threshold value $R_t$, wherein k is a number of search terms in the past request being replaced by a respective synonym for each search term.

15. The computer system of claim 11, said adjusting comprising:

mapping each reusable asset in the new search result to a predefined quality metric to determine reusability for each reusable asset within the new search result, wherein the predefined quality metric is selected from the group consisting of a certification, an error test result, a user feedback, and combinations thereof.

16. A process for supporting computer infrastructure, said process comprising providing at least one support service for at least one of creating, integrating, hosting, maintaining, and deploying computer-readable code in a computing system, wherein the code in combination with the computing system is capable of performing a method for searching and retrieving at least one reusable asset, a first asset of said at least one reusable asset being stored in an index file in a database, a search request comprising at least one search term, the method comprising:

receiving a new request comprising a first search term of said at least one search term;

searching the index file for the first search term in the new request, said searching comprising selecting, from the index file, all reusable assets having the first search term;

building a new search result with all reusable assets having been selected from the index file during said searching;

retrieving a past request from a search history stored in the database, the past request comprising a second search term of said at least one search term, the past request being coupled to a past search result comprising a second asset of said at least one reusable asset;

correlating the new request with the past request, said correlating comprising:

calculating a correlation coefficient R between the new request and the past request;

determining the correlation coefficient R being greater than or equal to a first predefined threshold value $R_t$ for request correlation in a range of 0.2 to 0.99;

adding the past search result to the new search result, wherein the past search result is not present within the new search result; and calculating a position value P of the past search result within the new search result as P=Round(wRS), wherein Round(x) is a mathematical function returning a closest integer to x, w is a predefined weight value chosen from a range of 0.1 to 1, and S is a number of reusable assets in the new search result;

adjusting a relevance of each reusable asset within the new search result, the relevance indicating how the past search result for said each reusable asset is correlated with the new search result pursuant to a number of occurrences of said at least one search term in said each reusable asset; and storing the new request and the new search result into the search request history in the database upon determining that the relevance of said each reusable asset in the new search result is greater than a second predefined threshold value for the relevance, wherein said receiving, said searching, said building, said retrieving, said correlating, said adjusting, and said storing are performed by a search server, and wherein the search server is configured to store into and retrieve from the database.

17. The process of claim 16, said calculating the correlation coefficient R comprising:

calculating the correlation coefficient R, wherein $$R = \frac{2n_c}{n_n + n_p},$$

wherein $n_c$ is a number of search terms common to both the new request and the past request, $n_n$ is a number of search terms in the new request, and $n_p$ is a number of search terms in the past request.

18. The process of claim 16, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request; and calculating the correlation coefficient R, wherein $$R = \frac{2(n_c + mr)}{n_n + n_p},$$

wherein the first correlation coefficient $R_1$ is less than the predefined threshold value $R_t$, wherein m is a number of search terms being replaced by a respective term from a same taxonomy level for each search term, and r is a predefined rate value within a range of 0 to 1.

19. The process of claim 16, said calculating the correlation coefficient R comprising:

calculating a first correlation coefficient $R_1$ between the new request and the past request, wherein $$R_1 = \frac{2n_c}{n_n + n_p},$$

wherein $n_c$ is a number of search terms common to both the new request and the past request, $n_n$ is a number of search terms in the new request, and $n_p$ is a number of search terms in the past request;

calculating a second correlation coefficient $R_2$ between the new request and the past request, wherein $$R_2 = \frac{2(n_c + mr)}{n_n + n_p},$$

wherein the first correlation coefficient $R_1$ is less than the predefined threshold value $R_t$, wherein m is a number of search terms in the past request being replaced by a respective term from a same taxonomy level for each search term, and r is a predefined rate value within a range of 0 to 1; and calculating the correlation coefficient R, wherein $$R = \frac{2(n_c + kr)}{n_n + n_p},$$

wherein the second correlation coefficient $R_2$ is less than the predefined threshold value $R_t$, wherein k is a number of search terms in the past request being replaced by a respective synonym for each search term.

20. The process of claim 16, said adjusting comprising:

mapping each reusable asset in the new search result to a predefined quality metric to determine reusability for each reusable asset within the new search result, wherein the predefined quality metric is selected from the group consisting of a certification, an error test result, a user feedback, and combinations thereof.

* * * * *